United States Patent [19]

Daimon et al.

[11] Patent Number: 5,643,703
[45] Date of Patent: Jul. 1, 1997

[54] HYDROXYGALLIUM PHTHALOCYANINE CRYSTAL, PROCESS FOR PREPARING SAME, AND ELECTROPHOTOGRAPHIC PHOTORECEPTOR COMPRISING SAME

[75] Inventors: Katsumi Daimon; Katsumi Nukada; Yasuo Sakaguchi; Ryosaku Igarashi, all of Kanagawa, Japan

[73] Assignee: Fuji Xerox Co., Ltd., Tokyo, Japan

[21] Appl. No.: 555,017

[22] Filed: Nov. 13, 1995

Related U.S. Application Data

[62] Division of Ser. No. 217,887, Mar. 25, 1994, Pat. No. 5,508,395.

[30] Foreign Application Priority Data

Mar. 25, 1993 [JP] Japan ..................... 5-89503

[51] Int. Cl.[6] ..................... G03G 5/06
[52] U.S. Cl. ..................... 430/78; 430/56
[58] Field of Search ..................... 430/78, 56

[56] References Cited

U.S. PATENT DOCUMENTS

| | | | |
|---|---|---|---|
| 2,770,629 | 11/1956 | Eastes | 260/314.5 |
| 3,160,635 | 12/1964 | Knudsen et al. | 260/314.5 |
| 3,357,989 | 12/1967 | Byrne et al. | 260/314.5 |
| 3,708,292 | 1/1973 | Brach et al. | 96/1.5 |
| 5,229,508 | 7/1993 | Ikegaya et al. | 540/141 |
| 5,302,479 | 4/1994 | Daimon et al. | 430/78 |
| 5,360,475 | 11/1994 | Nukada et al. | 540/141 |
| 5,459,004 | 10/1995 | Katsumi et al. | 430/78 |
| 5,473,064 | 12/1995 | Mayo | 540/141 |

FOREIGN PATENT DOCUMENTS

| | | |
|---|---|---|
| 0 584 754 | 3/1994 | European Pat. Off. |
| 48-34189 | 5/1973 | Japan |
| 49-105536 | 10/1974 | Japan |
| 50-38543 | 4/1975 | Japan |
| 57-148745 | 9/1982 | Japan |
| 58-21416 | 2/1983 | Japan |
| 59-133551 | 7/1984 | Japan |
| 60-59354 | 4/1985 | Japan |
| 61-151659 | 7/1986 | Japan |
| 1-221459 | 9/1989 | Japan |
| 3-30854 | 5/1991 | Japan |
| 3-181570 | 8/1991 | Japan |
| 60-01923 | 1/1994 | Japan |
| 2 225 569 | 11/1992 | United Kingdom |
| 2 255 980 | 11/1992 | United Kingdom |

OTHER PUBLICATIONS

Bull. Soc. Chim. France, vol. 23 (1962).
Inorg. Chem. (1980), 19, 3131.
Journal of Imaging science, vol. 29, pp. 7–10 (1985).
Chemical Abstracts, vol. 115, No. 20, Nov. 18, 1991, abstract No. 210210n, p. 117.

*Primary Examiner*—Christopher D. Rodee
*Attorney, Agent, or Firm*—Oliff & Berridge

[57] ABSTRACT

A hydroxygallium phthalocyanine crystal, having distinct diffraction peaks at Bragg angles (2θ+/−0.2°) of 7.0°, 13.4°, 16.6°, 26.0° and 26.7° to CuKα characteristic X-ray in X-ray diffraction spectrum; a process for preparing the hydroxygallium phthalocyanine crystal; and a electrophotographic photoreceptor comprising the hydroxygallium phthalocyanine crystal.

1 Claim, 2 Drawing Sheets

HYDROXYGALLIUM PHTHALOCYANINE CRYSTAL, PROCESS FOR PREPARING SAME, AND ELECTROPHOTOGRAPHIC PHOTORECEPTOR COMPRISING SAME

This application is a division of application Ser. No. 08/217,887, filed Mar. 25, 1994, now U.S. Pat. No. 5,508,395.

FIELD OF THE INVENTION

The present invention relates to a hydroxygallium phthalocyanine crystal useful as a photoconductive material, a process for the preparation of such a hydroxygallium phthalocyanine crystal, and an electrophotographic photoreceptor comprising such a hydroxygallium phthalocyanine crystal.

BACKGROUND OF THE INVENTION

A phthalocyanine compound is useful as a coating, printing ink, catalyst or electronic material. In particular, the application of such a phthalocyanine compound to an electrophotographic photoreceptor, an optical recording material, and a photo-electric converter has been extensively studied.

An electrophotographic photoreceptor has recently been increasingly demanded for the expansion of the sensitive wavelength range from the sensitive range of the prior art organic photoconductive material to the wavelength range of near infrared semiconductor laser (780 to 830 nm), for the use as a photoreceptor for digital recording in laser printer. In this respect, squarylium compounds (as disclosed in JP-A-49-105536 and JP-A-58-21416 (The term "JP-A" as used herein means an "unexamined published Japanese patent application"), triphenylamine trisazo compounds (as disclosed in JP-A-61-151659), phthalocyanine compounds (as disclosed in JP-A-48-34189 and JP-A-57-148745), etc. have been proposed as photoconductive materials for semiconductor laser.

Organic photoconductive materials to be used as photoreceptors for semiconductor laser must be sensitive up to long wavelength range. The photoreceptors formed by the organic photoconductive materials must exhibit a high sensitivity and an excellent durability. The foregoing prior art organic photoconductive materials cannot sufficiently meet these requirements.

In order to overcome these difficulties, the relationship between the crystal form and the electrophotographic properties has been studied on the organic photoconductive materials. In particular, many reports have been made on phthalocyanine compounds.

In general, phthalocyanine compounds are known to exhibit various crystal forms depending on preparation method and processing methods. It is also known that the difference in the crystal form has a great effect on the photoelectric properties of the phthalocyanine compounds. As the crystal forms of phthalocyanine compounds such as copper phthalocyanine, the stable $\beta$- form as well as $\alpha$-, II-1, $\chi$-1, $\rho$-, $\gamma$-, and $\delta$-forms are known (as disclosed in U.S. Pat. Nos. 2,770,629, 3,160,635, 3,708,292, and 3,357,989). JP-A-50-38543 describes the relationship between the difference in the crystal form and the electrophotographic sensitivity of copper phthalocyanine.

With reference to gallium phthalocyanine prepared by an acid pasting process, JP-A-1-221459 describes two crystal forms and their electrophotographic properties, and Bull. Soc. Chim. France., vol. 23 (1962) describes preparation of a hydroxygallium phthalocyanine by acid-pasting chlorogallium phthalocyanine with sulfuric acid.

However, the phthalocyanine compounds which have been heretofore proposed, if used as photosensitive materials, are not sufficient in respect to photosensitivity and durability. It has thus been desired to develop a phthalocyanine compound having a new crystal form suitable as a photosensitive material which exhibits an improved photosensitivity and durability while making the best use of the feature of phthalocyanine compounds.

The present invention has been worked out on the basis of the foregoing circumstances.

SUMMARY OF THE INVENTION

An object of the present invention is to provide a novel hydroxygallium phthalocyanine crystal that exhibits stable properties as a photoconductive material.

Another object of the present invention is to provide a process for preparing the above hydroxygallium phthalocyanine crystal.

Further object of the present invention is to provide an electrophotographic photoreceptor having a high sensitivity and an excellent durability that comprises the above hydroxygallium phthalocyanine crystal as a photoconductive material.

Other objects and effects of the present invention will be apparent from the following description.

As a result of studies, the present inventors have found that a novel hydroxygallium phthalocyanine crystal can be obtained by a process which comprises acid-pasting a gallium phthalocyanine compound to obtain a hydroxygallium phthalocyanine, wherein a mixture of an alkaline aqueous solution and an organic solvent is used, and that such a novel hydroxygallium phthalocyanine crystal can be used to obtain an electrophotographic photoreceptor having a high sensitivity and an excellent durability. Thus, the present invention has been worked out.

The present invention relates to a hydroxygallium phthalocyanine crystal having distinct diffraction peaks at Bragg angles (2θ+/−0.2°) of 7.0°, 13.4°, 16.6°, 26.0°, and 26.7° to CuKα characteristic X-ray in X-ray diffraction spectrum.

The process for the preparation of the foregoing hydroxygallium phthalocyanine crystal according to the present invention, the process comprising the steps of: adding a gallium phthalocyanine to a concentrated acid to make a solution or a slurry; and then bringing the solution or the slurry into contact with an alkaline aqueous solution containing an organic solvent.

The present invention also relates to an electrophotographic photoreceptor comprising an electrically conductive support having thereon a photosensitive layer, the photosensitive layer comprising the above hydroxygallium phthalocyanine crystal.

DETAILED DESCRIPTION OF THE INVENTION

Figure 1:
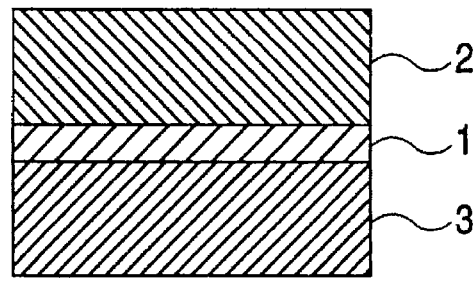
FIGS. 1 to 4 each show a schematic cross section of the electrophotographic photoreceptor according to the present invention.

The gallium phthalocyanine employable as a starting material in the present invention may have a ligand.

Examples of the gallium phthalocyanine include gallium phthalocyanine, chlorogallium phthalocyanine, bromogallium phthalocyanine, and iodogallium phthalocyanine. The species of the ligand on gallium are not specifically limited. These gallium phthalocyanines can be synthesized by any known method, such as chlorogallium phthalocyanine synthesis methods as disclosed in *D. C. R. Acad. Sci.*, (1956), 242, 1026, JP-B- 3-30854 (The term "JP-B" as used herein means an "examined Japanese patent publication"), JP-A-1-221459, and *Inorg. Chem.*, (1980), 19, 3131, bromogallium phthalocyanine synthesis methods as disclosed in JP-A-59-33551, and iodogallium phthalocyanine synthesis methods as disclosed in JP-A-60-59354. Further, gallium phthalocyanine synthesized from gallium trialkoxide or the like may be used.

The above gallium phthalocyanine is subjected to a so-called acid pasting treatment to obtain a hydroxygallium phthalocyanine having a novel crystal form. That is, the gallium phthalocyanine is added to a concentrated acid to make a solution or a slurry, and the acidic solution or slurry is then brought into contact with an alkaline aqueous solution containing an organic solvent.

Examples of the concentrated acid include sulfuric acid, hydrochloric acid, hydrobromic acid, and trifluoroacetic acid. The concentration of the concentrated acid is preferably 70% by weight or more, and particularly preferably 90% by weight or more. Concentrated sulfuric acid advantageously has a high dissolving power and can be easily handled. Concentrated sulfuric acid having a concentration of 70% by weight or more is preferred and that having a concentration of 90% or more is particularly preferred. The concentrated acid is generally used in an amount of 5 to 100 times by weight, and preferably 15 to 40 times by weight, the amount of the gallium phthalocyanine.

Examples of the alkali employable in the present invention include sodium hydroxide, potassium hydroxide, sodium carbonate, potassium carbonate, ammonia, and various ammonium hydroxides. Ammonia is preferably used since it hardly remains in the resulting crystals. If the concentration of the alkali in the alkaline aqueous solution is too low, a large amount of a solvent is needed, which is not advantageous. If it is too high, a large amount of heat generates upon contacting, which is also not advantageous. Therefore, the concentration of the alkali is preferably from 10 to 30% by weight.

Examples of the organic solvent employable in the present invention include alcohols such as methanol, glycols such as ethylene glycol, glycerin and polyethylene glycol, ketones such as methyl ethyl ketone, esters such as ethyl acetate and butyl acetate, halogenated hydrocarbons such as dichloromethane and chloroform, and aromatic hydrocarbons such as toluene and xylene. Acetone and dichloromethane are preferably used, since they are stable with respect to acids. The amount of the organic solvent to be used is generally in the range of ⅟10 to 10 times, and preferably ½ to 5 times, the amount of water contained in the alkaline aqueous solution.

The temperature, at which the acidic solution or slurry is brought into contact with the alkaline aqueous solution, is generally from −15° C. to 100° C., and preferably below the boiling point of the alkaline aqueous solution.

The alkaline aqueous solution is generally used in an amount of 1 to 100 times, and preferably 3 to 20 times, the amount of acidic solution or slurry of gallium phthalocyanine.

The method for bringing the acidic solution or slurry of the gallium phthalocyanine into contact with the alkaline aqueous solution containing an organic solvent is not particularly limited. It is preferred that the acidic solution or slurry is added dropwise to the alkaline aqueous solution with stirring. By adding dropwise the acidic solution or slurry to the mixture of an alkaline aqueous solution and an organic solvent with stirring with the solution temperature being kept at below the boiling point of the organic solvent, a hydroxygallium phthalocyanine is produced. The hydroxygallium phthalocyanine crystal thus obtained is then washed and purified with water or the like. Thus, a hydroxygallium phthalocyanine crystal having main diffraction peaks at Bragg angles (2θ+/−0.2°) of 7.0°, 13.4°, 16.6°, 26.0° and 26.7° to CuKα characteristic X-ray in X-ray diffraction spectrum can be obtained.

By contacting the acidic solution or slurry to the alkaline aqueous solution containing an organic solvent, the following possible advantages can be given over the prior art process in which an acidic solution or slurry of gallium phthalocyanine is brought into contact with water alone: (1) a product containing less impurities that are soluble in the organic solvent can be obtained, and (2) since the acid contained in the acidic solution or slurry can be immediately neutralized with an alkali contained in the alkaline aqueous solution, there remains no acid in the crystal as an impurity that would have an adverse effect on the crystal.

The above process according to the present invention can be easily applied to gallium phthalocyanine as well as other phthalocyanine compounds.

The electrophotographic photoreceptor comprising a hydroxygallium phthalocyanine crystal prepared by the foregoing method as a charge generating material will be described hereinafter.

A photosensitive layer of the photoreceptor may have a single layer structure or a so-called separate function type laminate structure composed of a charge generating layer and a charge transporting layer.

Where a photosensitive layer has a laminate structure, the charge generating layer comprises the hydroxygallium phthalocyanine crystal and a binder resin.

Figure 2:
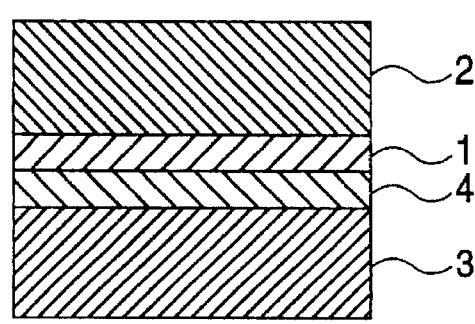
Figure 3:
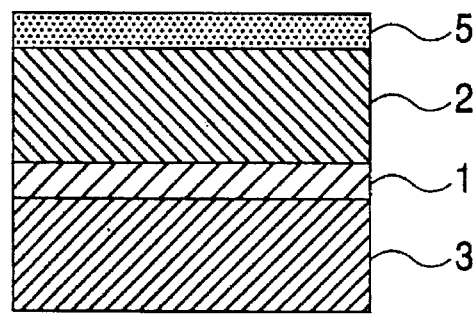
Figure 4:
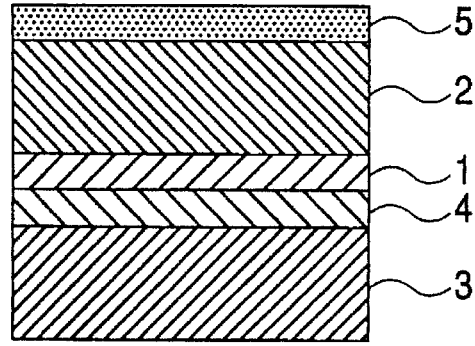

A schematic cross section of the photoreceptor according to the present invention is shown in FIGS. 1 through 4. The photoreceptor of FIG. 1 comprises conductive substrate 3 having provided thereon a photosensitive layer composed of charge generating layer 1 and charge transporting layer 2 laminated on charge generating layer 1. Subbing layer 4 may be provided between charge generating layer 1 and conductive substrate 3 as shown in FIG. 2. Protective layer 5 may be provided on the surface of the photosensitive layer as shown in FIG. 3. The photoreceptor of FIG. 4 has both subbing layer 4 and protective layer 5.

The structure of the photosensitive layer will hereinafter be explained chiefly with reference to the laminate structure composed of layers 1 to 3 or 1 to 5, occasionally referring to the single layer structure.

Charge generating layer 1 is formed by coating conductive support 3 or subbing layer 4 with a coating composition prepared by dissolving a binder resin in an organic solvent and dispersing the hydroxygallium phthalocyanine crystal in the solution.

Binder resins to be used can be chosen from a broad range of resins. Examples of the binder resin include insulating resins, such as polyvinyl acetal resins (including polyvinyl butyral, polyvinyl formal, and partially acetal-modified polyvinyl butyral obtained by displacing part of the butyral moiety with formal or acetoacetal), polyarylate resins (e.g., a polycondensate of bisphenol A and phthalic acid), polycarbonate resins, polyester resins, modified ether type polyester resins, phenoxy resins, polyvinyl chloride resins, polyvinylidene chloride resins, polyvinyl acetate resins, polystyrene resins, acrylic resins, methacrylic resins, polyacrylamide resins, polyamide resins, polyvinyl pyridine resins, cellulose resins, urethane resins, epoxy resins, silicone resins, polyvinyl alcohol resins, polyvinyl pyrrolidone resins, casein, vinyl chloride-vinyl acetate copolymer resins (such as a vinyl chloride-vinyl acetate copolymer, a hydroxyl-modified vinyl chloride-vinyl acetate copolymer, a carboxyl-modified vinyl chloride-vinyl acetate copolymer, and a vinyl chloride-vinyl acetatemaleic anhydride copolymer), styrene-butadiene copolymers, vinylidene chloride-acrylonitrile copolymers, styrene-alkyd resins, silicone-alkyd resins, and phenol-formaldehyde resins. Organic photoconductive polymers, such as poly-N-vinylcarbazole, polyvinyl anthracene, and polyvinylpyrene, can also be used. These specific examples are not to limit the binder resins to be used. These binder resins may be used either individually or in combination of two or more thereof.

Solvents to be used in the coating composition are preferably selected from those capable of dissolving the binder resin and incapable of dissolving a lower layer, e.g., a subbing layer. Examples of the solvents include alcohols, e.g., reethanol, ethanol, n-propanol, isopropanol, n-butanol, and benzyl alcohol; ketones, e.g., acetone, methyl ethyl ketone (MEK), and cyclohexanone; amides, e.g., dimethylformamide (DMF) and dimethylacetamide; sulfoxides, e.g., dimethyl sulfoxide; cyclic or acyclic ethers, e.g., dioxane, diethyl ether, methyl cellosolve, and ethyl cellosolve; esters, e.g., methyl acetate, ethyl acetate, n-propyl acetate, isopropyl acetate, n-butyl acetate, i-butyl acetate, sec-butyl acetate, t-butyl acetate, n-amyl acetate, i-amyl acetate, methyl propionate, ethyl propionate, n-butyl propionate, and ethyl butyrate; aliphatic halogenated hydrocarbons, e.g., dichloromethane, chloroform, carbon tetrachloride, dichloroethylene, and trichloroethylene; mineral oils, e.g., ligroin; aromatic hydrocarbons, e.g., benzene, toluene, and xylene; and aromatic halogenated hydrocarbons, e.g., dichlorobenzene. These solvents may be used either individually or in combination of two or more thereof.

The weight ratio of the hydroxygallium phthalocyanine crystal to the binder resin is generally from $^{40}/_1$ to $^1/_{20}$, and preferably from $^{10}/_1$ to $^1/_{10}$. if the ratio of the hydroxygallium phthalocyanine crystal is too high, the coating composition may have reduced stability. If it is too low, the resulting photoreceptor may have reduced sensitivity. The coating composition preferably comprises from 1 to 5 parts by weight of the hydroxygallium phthalocyanine crystal, from 1 to 5 parts by weight of a binder resin, and from 40 to 120 parts by weight of a dispersing solvent. The above compounding ratios can also be applied to a photosensitive layer having the single layer structure.

In dispersing the hydroxygallium phthalocyanine crystal in a solvent containing a binder resin, conditions that induce a change of the crystal form should be avoided. Apparatus which can be used for dispersing include a ball mill, an attritor, a sand grinder mill, a dynomill, a paint shaker, and a homomixer.

It is effective to finely disperse the crystal to a particle size of not greater than 0.5 μm, more preferably not greater than 0.2 μm, and particularly preferably from 0.03 to 0.15 μm. Too fine hydroxygallium phthalocyanine particles having a primary particle diameter of less than 0.01 μm have poor crystal form stability in the solvent and are liable to transformation to another crystal form. If the dispersion contains large particles having a primary particle diameter greater than 0.5 μm, the resulting electrophotographic photoreceptor undergoes serious reduction in sensitivity and stability. Accordingly, the crystal size is preferably in the range of from 0.01 to 0.5 μm.

Coating can be carried out by any of known techniques, such as dip coating, spray coating, spinner coating, bead coating, blade coating, roller coating, and curtain coating. Drying of the coating is preferably conducted first at room temperature to once obtain a dry-to-touch state and then under heating at a temperature of from 30° to 200° C. for 5 minutes to 2 hours in still air or in an air flow.

The charge generating layer generally has a dry thickness of from about 0.015 to about 5 μm, and preferably from 0.1 to 2.0 μm.

In the present invention, it is preferable to use at least one binder resin selected from the group consisting of polyvinyl acetal resins, vinyl chloride-vinyl acetate copolymer resins, phenoxy resins, and modified ether type polyester resins, more preferably from the group consisting of polyvinyl acetal resins and vinyl chloride-vinyl acetate copolymer resins, from the standpoint of dispersibility of the hydroxygallium phthalocyanine crystal, coating properties of the resulting dispersion, and performance properties of the resulting photoreceptor, such as sensitivity, charge retention, and image quality. It is preferable to use an acetic ester as a dispersing solvent because acetic ester solvents cause no change of crystal form of the hydroxygallium phthalocyanine crystal not only during preparation of the dispersion but also over an extended period of time after coating the dispersion. In particular, a coating composition comprising an acetic ester as a solvent having dissolved therein at least one of the above-described specific binder resins and having dispersed therein the hydroxygallium phthalocyanine crystal is the most preferred.

Charge transporting layer 2, which is laminated on charge generating layer 1, comprises a charge transporting material and an appropriate binder resin.

Any of known charge transporting materials can be utilized. Examples of the charge transporting materials, while not limiting, include oxadiazole derivatives, e.g., 2,5-bis-(p-diethylaminophenyl)-1,3,4-oxadiazole; pyrazoline derivatives, e.g., 1,3,5-triphenylpyrazoline and 1-[pyridyl-(2)]-3-(p-diethylaminostyryl)-5-(p-diethylaminophenyl) pyrazoline; aromatic tertiary monoamine compounds, e.g., triphenylamine and dibenzylaniline; aromatic tertiary diamine compounds, e.g., N,N-diphenyl-N,N'-bis(m-tolyl) benzidine; 1,2,4-triazine derivatives, e.g., 3-(p-diethylaminophenyl)-5,6-di(p-methoxyphenyl)-1,2,4-triazine; hydrazone derivatives, e.g., 4-diethylaminobenzaldehyde-2,2-diphenylhydrazone; quinazoline derivatives, e.g., 2-phenyl-4-styrylquinazoline; benzofuran derivatives, e.g., 6-hydroxy-2,3-di (pmethoxyphenyl)benzofuran; a-stilbene derivatives, e.g., p-(2,2-diphenylvinyl)-N,N-diphenylaniline; triphenylmethane derivatives; enamine derivatives described in *Journal of Imaging Science*, vol. 29, pp. 7–10 (1985); carbazole derivatives, e.g., carbazole, N-ethylcarbazole, poly-N-vinylcarbazole, halogenated poly-N-vinylcarbazole, polyglycidyl carbazole, and Poly-γ-carbazole ethylglutamate; polycyclic aromatic compounds, e.g., anthracene, pyrene, and phenanthrene; nitrogen-containing heterocyclic compounds, e.g., indole and imidazole; polyvinyl anthracene, poly-9-vinylphenyl anthracene, polyvinyl pyrene, polyvinyl acridine, polyvinyl acenaphthylene, pyrene-formaldehyde resins, and ethylcarbazole-formaldehyde resins. These charge transporting materials may be used either individually or in combination of two or more thereof. In case of using a film-forming polymeric charge transporting material, a binder resin may not be used.

Binder resins which can be used in a charge transporting layer can be selected from those described above with reference to the charge generating layer. A charge transporting layer can be formed by coating a coating composition comprising the above-described charge transporting material, a binder resin, and an organic solvent selected from those described above for the charge generating layer. The weight ratio of the charge transporting material to the binder resin is preferably from 10/1 to 1/5.

The charge transporting layer has a dry thickness generally of from about 5 to about 50 μm, and preferably of from 10 to 30 μm.

Where a photoreceptors has the single layer structure, the photosensitive layer is a photoconductive layer in which the hydroxygallium phthalocyanine crystal is dispersed in a binder resin together with a charge transporting material. These components may be the same as those hereinabove described. For the same reasons as described above, the binder resin is preferably selected from the group consisting of polyvinyl acetal resins, vinyl chloride-vinyl acetate copolymer resins, phenoxy resins, and modified ether type polyester resins, more preferably from the group consisting of polyvinyl acetal resins and vinyl chloride-vinyl acetate copolymer resins, and the dispersing solvent is preferably selected from acetic esters. The weight ratio of the hydroxygallium phthalocyanine crystal to the charge transporting material preferably ranges from 1/10 to 10/1, and the weight ratio of the charge transporting material to the binder resin preferably ranges from about 1/20 to about 5/1.

Any conductive substrate known useful in electrophotographic photoreceptors can be used in the present invention. Examples of the substrates include metals, e.g., aluminum, nickel, chromium, and stainless steel; plastic films having thereon a thin film of aluminum, titanium, nickel, chromium, stainless steel, gold, vanadium, tin oxide, indium oxide, indium-tin oxide, etc.; and paper or plastic films having coated thereon or impregnated therein a conductivity imparting agent. While not limiting, the conductive substrate usually has a shape of a drum, a sheet, or a plate.

If desired, the conductive substrate may be subjected to various surface treatments as far as the image quality is not impaired. For example, it may be subjected to an oxidation treatment, a chemical treatment, a coloring treatment, or a non-specular finish, such as graining.

A subbing layer may be provided between the conductive substrate and a photosensitive layer. The subbing layer is effective for blocking unnecessary charges which may be introduced from the conductive substrate into a photosensitive layer having a laminate structure on charging of the photosensitive layer. It also serves to improve adhesion between the conductive substrate and the photosensitive layer. In some cases, the subbing layer also produces an effect of blocking light reflecting on the substrate.

Examples of the materials for constituting a subbing layer include polyethylene resins, polypropylene resins, acrylic resins, methacrylic resins, polyamide resins, vinyl chloride resins, vinyl acetate resins, phenol resins, polycarbonate resins, polyurethane resins, polyimide resins, vinylidene chloride resins, polyvinyl acetal resins, vinyl chloride-vinyl acetate copolymers, polyvinyl alcohol resins, polyacrylic acid resins, polyacrylamide resins, polyvinyl pyrrolidone resins, pollvinyl pyridine resins, water-soluble polyester resins, cellulose ester resins (e.g., nitrocellulose), cellulose ether resins, casein, gelatin, polyglutamic acid, starch, starch acetate, amino starch, organozirconium compounds (e.g., zirconium chelate compounds), organotitanium compounds (e.g., titanyl chelate compounds and titanium alkoxide compounds), and silane coupling agents.

Coating of the subbing layer can be carried out in a usual manner, for example, blade coating, spin coating, spray coating, dip coating, bead coating, roller coating, and curtain coating. The subbing layer generally has a thickness of from 0.01 to 10 μm, and preferably from 0.05 to 2 μm.

A protective layer may be provided on the surface of a photosensitive layer. The protective layer serves to prevent chemical denaturation of the charge transporting layer upon charging and also to improve mechanical strength of the photosensitive layer.

The protective layer comprises an appropriate binder resin having dispersed therein a conductive material. Examples of the conductive material include metallocene compounds, such as dimethylferrocene; aromatic amine compounds, such as N,N'-diphenyl-N,N'-bis(m-tolyl)benzidine; and metal oxides, such as antimony oxide, tin oxide, titanium oxide, indium oxide, and tin-antimony oxide. The binder resin to be used may be conventional ones and includes polyamide resins, polyurethane resins, polyester resins, epoxy resins, polyketone resins, polycarbonate resins, polyvinyl ketone resins, polystyrene resins, and polyacrylamide resins.

The protective layer is preferably designed so as to have a volume resistivity of from $10^9$ to $10^{14}$ Ω·cm. If the volume resistivity exceeds $10^{14}$ Ω·cm, the residual potential tends to increase, causing fog. If it is lower than $10^9$ Ω·cm, the image obtained tends to suffer from blur and reduction in resolving power. In addition, the protective layer should be so designed not to substantially interfere with transmission of image wise irradiated light.

Coating of the protective layer can be carried out in a conventional manner, for example, blade coating, spin coating, spray coating, dip coating, bead coating, roller coating, and curtain coating. Protective layer 5 generally has a thickness of from 0.5 to 20 μm, and preferably from 1 to 10 μm.

The present invention is now illustrated in greater detail with reference to Examples, but it should be understood that the present invention is not deemed to be limited thereto. All the parts and percents are by weight unless otherwise indicated.

EXAMPLE 1

31.8 parts of phthalonitrile, 10.1 parts of gallium trimethoxide, and 150 ml of ethylene glycol were stirred at a temperature of 200° C. in an atmosphere of nitrogen for 24 hours. The resulting product was then filtered. The product was washed with N,N-dimethylformamide and then with methanol, and then dried to obtain 25.1 parts of gallium phthalocyanine.

Figure 5:
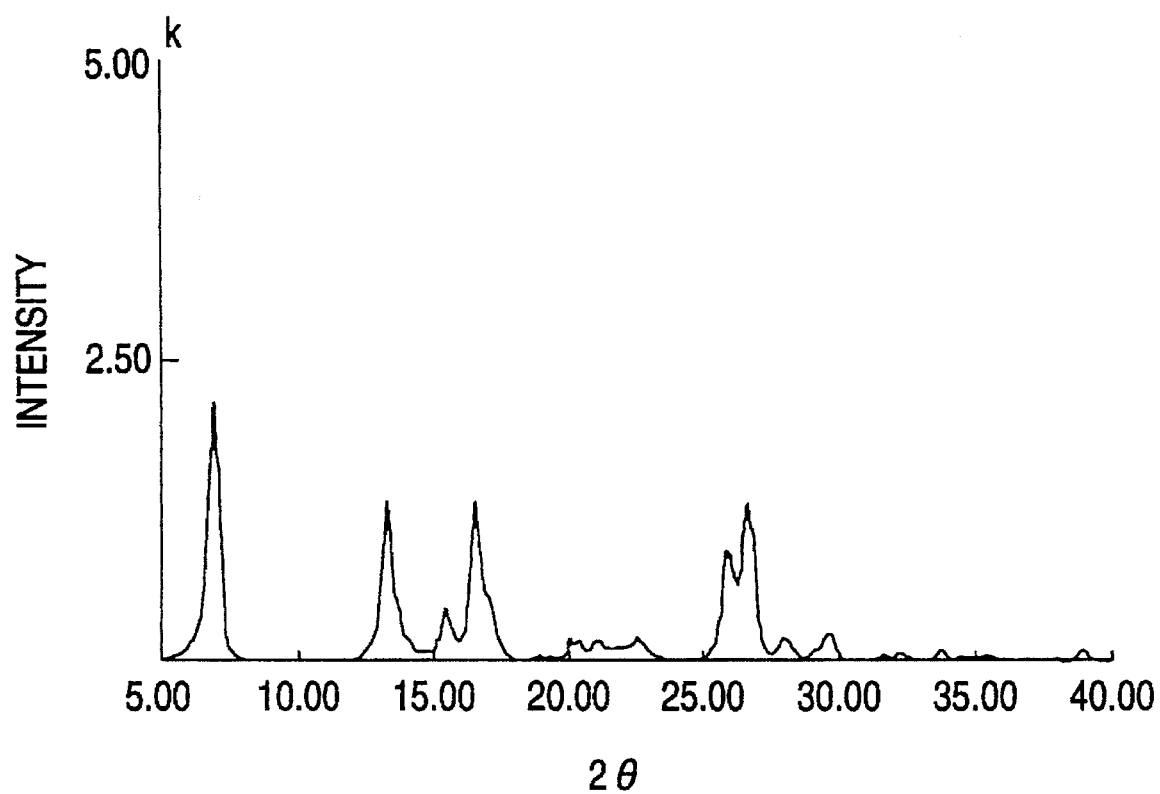
FIG. 5 illustrates the powder X-ray diffraction spectrum of a hydroxygallium phthalocyanine crystal according to the present invention.

2 parts of the gallium phthalocyanine thus obtained were dissolved in 50 parts of concentrated sulfuric acid. The solution was stirred for 2 hours, and then added dropwise to a mixture of 75 ml of distilled water, 75 ml of concentrated aqueous ammonia and 150 ml of dichloromethane, which had been cooled with ice, so as to cause crystallization of phthalocyanine. The resulting crystal was thoroughly washed with distilled water, and then dried to obtain 1.8 parts of a hydroxygallium phthalocyanine crystal. The crystal exhibited distinct diffraction peaks at Bragg angles (2θ+/−0.2°) of 7.0°, 13.4°, 16.6°, 26.0°, and 26.7° to CUKα characteristic X-ray, as shown in FIG. 5.

EXAMPLE 2

To 100 ml of α-chloronaphthalene were added 10 parts of gallium trichloride and 29.1 parts of orthophthalonitrile. The mixture was then allowed to undergo reaction at a temperature of 200° C. in a stream of nitrogen for 24 hours. The resulting chlorogallium phthalocyanine crystal was then recovered by filtration. The wet cake thus obtained was dispersed in 100 ml of dimethylformamide, stirred at an elevated temperature of 150° C. for 30 minutes, filtered off, washed thoroughly with methanol, and then dried to obtain 28.9 parts of a chlorogallium phthalocyanine crystal.

2 parts of the chlorogallium phthalocyanine thus obtained were dissolved in 50 parts of concentrated sulfuric acid. The solution was stirred for 2 hours, and then added dropwise to a mixture of 75 ml of distilled water, 75 ml of concentrated aqueous ammonia and 450 ml of acetone, which had been cooled with ice, so as to cause crystallization of phthalocyanine. The resulting crystal was thoroughly washed with distilled water, and then dried to obtain 1.8 parts of a hydroxygallium phthalocyanine crystal. The powder X-ray diffraction spectrum of the crystal was the same as that shown in Example 1 (FIG. 5).

EXAMPLE 3

1.8 parts of a hydroxygallium phthalocyanine crystal was obtained in the same manner as in Example 1 except that 150 ml of dichloromethane was replaced by 450 ml of acetone. The powder X-ray diffraction spectrum of the crystal was the same as that shown in Example 1 (FIG. 5).

EXAMPLES 4 TO 6

Onto an aluminum substrate was coated a solution composed of 10 parts of a zirconium compound (trade name: Orgatics ZC540, Matsumoto Seiyaku Co., Ltd.) and 1 part of a silane compound (trade name: A1110, available from Nippon Unicar Co., Ltd.) in 40 parts of i-propanol and 20 parts of butanol by dip coating method. The substrate having a coated layer was then heated and dried at a temperature of 150° C. for 10 minutes to form a subbing layer having a thickness of 0.2 μm.

Subsequently, 1 part of each of the hydroxygallium phthalocyanine crystals obtained in Examples 1 to 3 was mixed with 1 part of a polyvinyl butyral resin (trade name: S-Lec BM-S, available from Sekisui Chemical Co., Ltd.) and 100 parts of n-butyl acetate. The mixture was then subjected to dispersing with glass beads by means of a paint shaker for 1 hour to obtain a dispersion. The resulting dispersion was dip-coated on the foregoing subbing layer, and then heated and dried at a temperature of 100° C. for 10 minutes to form a charge-generating layer having a thickness of about 0.2 μm.

Subsequently, 2 parts of a charge-transporting material represented by the following structural formula (1) and 3 parts of a polycarbonate resin comprising a repeating unit represented by the following structural formula (2) were dissolved in 20 parts of monochlorobenzene. The resulting coating solution was dip-coated on the aluminum substrate on which a charge-generating layer had been formed, and then heated at a temperature of 120° C. for 1 hour to form a charge-transporting layer having a thickness of 20 μm.

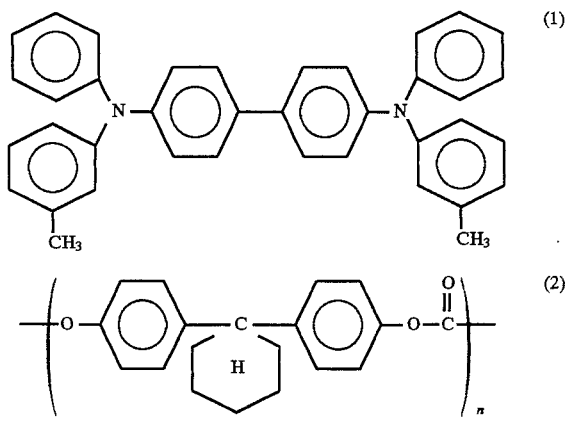

These electrophotographic photoreceptors thus obtained were then measured for electrophotographic properties as follows:

These electrophotographic photoreceptors were each charged to an initial surface potential $V_O$ (V) by corona discharge of $-2.5$ μA using a flat plate scanner in an atmosphere of normal temperature and humidity (20° C., 40%RH), allowed to stand for 1 second, and then measured for $V_{DDP}$ (V), from which percent dark decay DDR (%) was calculated by the following formula:

$$DDR\ (\%) = 100 \times (V_O - V_{DDP})/V_O$$

Thereafter, light from a tungsten lamp was spectrally separated into a monochromatic light having a wavelength of 780 nm, and then applied to the photoreceptor with its intensity adjusted to 0.25 μW/cm$^2$ at the surface of the photoreceptor. The exposure at which the surface potential of the photoreceptor became half of the initial value ($E_{1/2}$ (erg/cm$^2$)) was then measured. The results are set forth in Table 1.

TABLE 1

| | Hydroxygallium phthalocyanine crystal | $V_0$ (V) | $E_{1/2}$ (erg/cm$^2$) |
|---|---|---|---|
| Example 4 | Example 1 | −559 | 4.0 |
| Example 5 | Example 2 | −580 | 4.0 |
| Example 6 | Example 3 | −560 | 4.0 |

The hydroxygallium phthalocyanine crystal according to the present invention has a novel crystal form and thus can be used as a photoconductive material to prepare an electrophotographic photoreceptor having a high photosensitivity. The electrophotographic photoreceptor thus obtained exhibits a high photosensitivity and an excellent stability and thus provides an excellent image quality when used with a printer utilizing a semiconductor laser.

While the invention has been described in detail and with reference to specific examples thereof, it will be apparent to one skilled in the art that various changes and modifications can be made therein without departing from the spirit and scope thereof.

What is claimed is:

1. An electrophotographic photoreceptor comprising an electrically conductive support having thereon a photosensitive layer, said photosensitive layer comprising a hydroxygallium phthalocyanine crystal having distinct diffraction peaks at Bragg angles (2θ+/−0.2°) of 7.0°, 13.4°, 16.6°, 26.0° and 26.7° to CuKα characteristic X-ray in X-ray diffraction spectrum.

* * * * *